United States Patent
Timtner

(10) Patent No.: US 8,136,397 B2
(45) Date of Patent: Mar. 20, 2012

(54) RECEIVING DEVICE FOR BALANCING DOUBLE COUPLINGS

(75) Inventor: Karlheinz Timtner, Bad Homburg (DE)

(73) Assignee: Schenck RoTec GmbH, Darmstadt (DE)

( * ) Notice: Subject to any disclaimer, the term of this patent is extended or adjusted under 35 U.S.C. 154(b) by 1008 days.

(21) Appl. No.: 12/148,023

(22) Filed: Apr. 16, 2008

(65) Prior Publication Data

US 2008/0280690 A1   Nov. 13, 2008

(30) Foreign Application Priority Data

May 8, 2007   (DE) .......................... 10 2007 022 009

(51) Int. Cl.
*G01M 1/00* (2006.01)
(52) U.S. Cl. ......................................... 73/487; 464/182
(58) Field of Classification Search ................ 73/487, 73/66, 460; 464/179, 182
See application file for complete search history.

(56) References Cited

U.S. PATENT DOCUMENTS

| | | | | |
|---|---|---|---|---|
| 5,271,651 A * | 12/1993 | Blatt et al. | ....................... | 269/71 |
| 6,102,383 A * | 8/2000 | Tunkers | ........................... | 269/24 |
| 6,378,855 B1 * | 4/2002 | Sawdon et al. | .................. | 269/32 |
| 6,439,560 B2 * | 8/2002 | Sawada et al. | .................. | 269/32 |
| 6,695,359 B2 * | 2/2004 | Morel et al. | ..................... | 269/49 |
| 6,698,736 B2 * | 3/2004 | Dugas et al. | ..................... | 269/32 |
| 6,902,160 B1 * | 6/2005 | Zajac et al. | ..................... | 269/49 |
| 6,913,254 B2 * | 7/2005 | Pavlik et al. | ..................... | 269/49 |
| 6,931,980 B1 * | 8/2005 | Zajac, Jr. et al. | ................ | 91/396 |
| 7,017,895 B2 * | 3/2006 | Sakamoto | ........................ | 269/32 |
| 7,188,832 B2 * | 3/2007 | Kita et al. | ........................ | 269/32 |
| 7,448,607 B2 * | 11/2008 | Steele et al. | ..................... | 269/32 |
| 7,467,788 B2 * | 12/2008 | McIntosh et al. | ................ | 269/32 |
| 7,516,948 B2 * | 4/2009 | McIntosh et al. | ................ | 269/32 |
| D612,227 S * | 3/2010 | Banasik et al. | .................. | D8/367 |
| 7,815,176 B2 * | 10/2010 | McIntosh et al. | ................ | 269/32 |
| D628,040 S * | 11/2010 | Banasik et al. | .................... | D8/71 |
| 8,049,954 B2 * | 11/2011 | Lipovetskaya et al. | ........ | 359/296 |
| 2002/0100155 A1 * | 8/2002 | Nakamura | .................... | 29/407.1 |
| 2005/0051939 A1 * | 3/2005 | Beffrieu | ........................... | 269/32 |
| 2007/0240507 A1 * | 10/2007 | Timtner et al. | .................. | 73/460 |

FOREIGN PATENT DOCUMENTS

| | | |
|---|---|---|
| DE | 22 59 190 | 5/1974 |
| DE | 10 2004 042 399 | 3/2005 |
| GB | 2 243 455 | 10/1991 |

\* cited by examiner

*Primary Examiner* — Hezron E Williams
*Assistant Examiner* — Samir M Shah
(74) *Attorney, Agent, or Firm* — Collard & Roe, P.C.

(57) ABSTRACT

In a device for receiving a multi-part constructional unit of a double coupling in a balancing machine there is provided a receiving mandrel which can be driven in rotation about its longitudinal axis and has a bearing face for centering a first coupling part and a centering pin arranged at the free end thereof. The device also comprises a clamping sleeve which can be moved by spring force into a clamping position and has a clamping face coaxial with the longitudinal axis of the receiving mandrel and a centering ring which is arranged on the centering pin, is held releasably thereon, has a centering face for centering further coupling parts and can be coupled in a torque-proof manner with the receiving mandrel in at least one angle position.

19 Claims, 3 Drawing Sheets

RECEIVING DEVICE FOR BALANCING DOUBLE COUPLINGS

FIELD OF THE INVENTION

The invention relates to a device for receiving a multi-part constructional unit of a double coupling in a balancing machine.

BACKGROUND AND SUMMARY

Double couplings are used in so-called double coupling transmissions or parallel transmissions for motor vehicles and are used for the switchable transmission of rapid rotational movements. They generally have a coupling cage with a plurality of pressure plates which are held in a torque-proof and axially movable manner in the coupling cage and driving discs arranged between the pressure plates. The coupling cage and the driving discs are respectively connected to hub bodies which may be positioned for mounting on gear shafts and for torque transmission to said gear shafts. The coupling cage, the pressure plates, the driving discs and the hub bodies form a structural unit which after assembly has to be balanced. For balancing the assembled constructional unit of a double coupling, it is necessary to receive and to retain the coupling cage and the driving discs by means of the hub body in a position corresponding to the subsequent installed position in the gearbox. It is also expedient if the driving discs are able to be retained in at least two different rotational angular positions relative to the coupling cage, in order to increase further the balancing accuracy by means of a second balancing process with rotated driving discs.

The object of the invention is to provide a device for receiving a multi-part constructional unit of a double coupling in a balancing machine which fulfils the aforementioned requirements and permits balancing of the constructional unit with a high degree of accuracy. The device is intended, moreover, to be able to be handled easily and reliably.

According to the invention, the device comprises a receiving mandrel which can be driven in rotation about its longitudinal axis and has a first portion for receiving and centering a first coupling part and a second portion arranged at its free end for receiving and centering at least one second coupling part, a first clamping device which is arranged on the first portion, can be moved by spring force into a clamping position and has a clamping face coaxial with the longitudinal axis of the receiving mandrel and a centering means which is arranged on the second portion and by means of which the second coupling part can be coupled in a torque-proof manner with the receiving mandrel in at least one angle position.

The device according to the invention permits the centering and clamping of the coupling cage by means of the receiving mandrel and the first clamping device and the centering of one or more hub bodies of the driving discs by means of the centering means. The centering means may have a second clamping device or a removable centering ring.

The first clamping device of the device according to the invention is used for clamping the first coupling part, said coupling part in particular being the hub of the coupling cage. According to the design of the hub, the clamping device may be designed to act internally or to act externally. An internally acting clamping device preferably has a radially expandable clamping sleeve which is arranged on the receiving mandrel so as to be axially movable and can rest against a conical face of the receiving mandrel. The clamping sleeve may be a slotted double conical sleeve which is expandable by means of a conical actuating sleeve arranged displaceably on the receiving mandrel. A clamping chuck resting on an annular flange of the receiving mandrel is particularly expedient as an externally acting clamping device.

A compression spring is provided for actuating the first clamping device, the receiving mandrel having a longitudinal hole, in which there are arranged the compression spring and an axially movable actuating element transmitting the force of the compression spring onto the clamping device.

The second clamping device of the centering means is according to the invention also movable by spring force into the clamping position, the receiving mandrel having a longitudinal hole in which there are arranged a compression spring and an axially movable actuating element transmitting the force of the compression spring onto the clamping device. The second clamping device may comprise at least one set of clamps comprising annular clamping discs and means for axially tightening the clamping discs. It may further be provided that the first and the second clamping devices are able to be actuated in succession by the same actuating element in such a way that one clamping device is releasable when the other clamping device is clamped. Alternatively, the clamping devices may be able to be actuated by two mutually independent actuating elements.

In a further advantageous embodiment, the second portion of the receiving mandrel can form a centering pin which carries a centering ring as a centering means which is releasably held on the centering pin, has a centering face for centering a second coupling part and is able to be coupled in a torque-proof manner to the receiving mandrel in at least one angular position. As the centering ring may be removed, the centering bore of the hub body, for example of the coupling cage, retained by the first clamping device may have a smaller diameter than the centering bore of a hub body retained by the centering ring, for example of the driving discs.

The centering bores of the driving discs are generally provided with teeth which are used for torque transmission to the corresponding gear shafts, the hub bodies also being centered on the gear shafts by means of the tooth profiles. For accurate balancing of the double coupling, therefore, the centering faces of the receiving mandrel and the centering ring are also provided with teeth corresponding to the gear shaft teeth. In order to facilitate the insertion of the receiving mandrel and the centering rings into the toothed bores of the hub bodies, the teeth on the receiving mandrel and on the centering ring on the insertion side are reduced and/or tapered in the axial and radial directions toward the end of the teeth.

During balancing, the transmission even of small torques is also required between the receiving mandrel, the centering ring and the parts of the double coupling when accelerating to balancing speed and stopping after the balancing. Moreover, the parts of the double coupling which may be rotated relative to one another have to be prevented from a relative movement during the balancing process. In order to achieve this in a simple manner by means of the centering ring, the centering ring has on its insertion side coupling recesses with which coupling projections configured on the receiving mandrel engage when the centering ring is connected to the centering pin. Preferably, a plurality of coupling recesses and/or coupling projections are provided, so that the centering ring can be coupled in a torque-proof manner with the coupling pin in a plurality of rotational angle positions.

A detent which can be locked in an interlocking manner, for example a ball detent, may be provided on the centering pin for axially fixing the centering ring.

BRIEF DESCRIPTION OF THE DRAWINGS

The invention is described in more detail hereinafter with reference to embodiments which are shown in the drawings, in which.

DETAILED DESCRIPTION OF THE DRAWINGS

Figure 1:
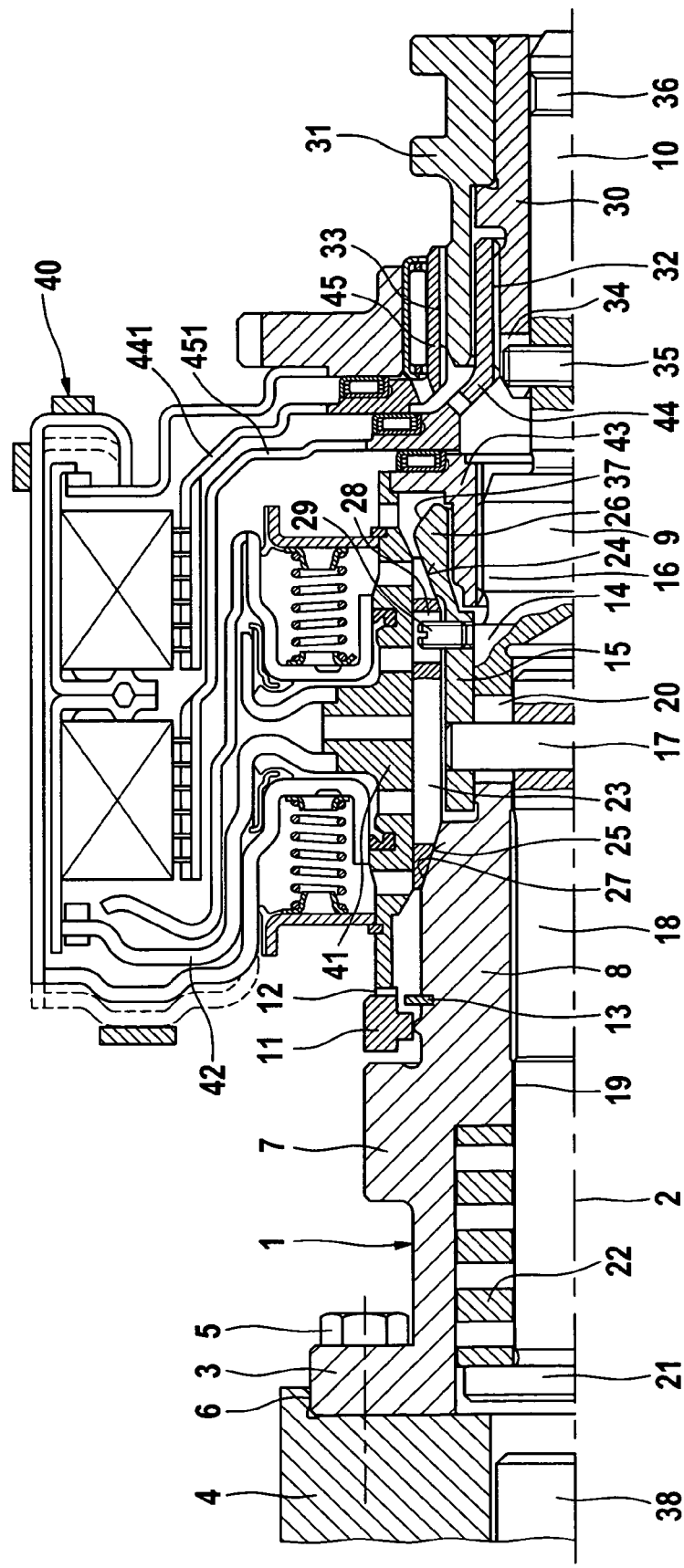
FIG. 1 shows a half-side longitudinal section through a device according to the invention with a double coupling arranged thereon and FIG. 2 shows a half-side longitudinal section through a further embodiment according to the invention with a double coupling arranged thereon and FIG. 3 shows a half-side longitudinal section of a further embodiment according to the invention with a second clamping device for clamping further coupling parts.

The device shown in FIG. 1 comprises a substantially rotationally symmetrical receiving mandrel 1 which extends along a longitudinal axis 2. The receiving mandrel 1 has at one end a flange 3 by which it may be fastened to a rotationally drivable shaft head 4 of a balancing machine by means of screws 5. For accurate centering of the receiving mandrel 1 on the shaft head 4, the flange 3 is provided with a coaxial, cylindrical peripheral surface 6. The receiving mandrel 1 comprises a plurality of mandrel portions 7, 8, 9 distinguished from one another by radial steps, the external diameter thereof reducing in a stepwise manner in the direction of the free end of the receiving mandrel 1 opposing the flange 3. The free end of the receiving mandrel 1 forms a cylindrical centering pin 10 which has the smallest external diameter.

A cardanic tilting ring 11 is arranged on the mandrel portion 8. The tilting ring 11 is mounted on a raised rib of the mandrel portion 8 and comprises on each of its opposing front faces diametrically arranged projections 12, which are respectively arranged offset relative to the projections of the other side by 90°. As a result, the tilting ring 11 forms an axial bearing which cooperates with the step of the mandrel portion 7 and compensates for deviations in position. By means of a locking ring 13, the tilting ring 11 is unreleasably retained on the receiving mandrel 1.

The mandrel portion 9 has a cylindrical bearing surface 14 for the axially movable mounting of an actuating sleeve 15. Adjacent to the bearing surface 14 is a centering face 16 provided with serrations. The actuating sleeve 15 is connected by a bolt 17 to an actuating pin 18 which is arranged in a central longitudinal hole 19 of the receiving mandrel extending from the flange 3 as far as the mandrel portion 9. The bolt 17 is passed through an opening 20 in the wall of the longitudinal hole 19 formed by the mandrel portion 9. The actuating pin 18 has at its end adjacent to the flange 3 a head 21 on which a pretensioned compression spring 22, arranged in a widened portion of the longitudinal hole 19, acts with a force oriented toward the shaft head 4.

The actuating sleeve 15 is surrounded by a clamping sleeve 23 configured as a slotted double conical sleeve. The clamping sleeve 23 has a cylindrical peripheral surface and a bore surface, of which the axial end regions 24, 25 have an outwardly widening conical shape. With the front end region 24 adjacent to the centering face 16, there engages a conical portion 26 of the actuating sleeve 15, the conical face thereof having the same gradient as the end region 24. The opposing rear end portion 25 lies against a correspondingly inclined conical face 27 of the mandrel portion 8. By means of a set screw 29, which engages in a slot 28 extending in the axial direction in the clamping sleeve 23 and is screwed into a threaded bore in the actuating sleeve 15, the clamping sleeve 23 is secured against rotation relative to the actuating sleeve 15.

An internal centering ring 30 is longitudinally displaceably arranged on the centering pin 10, and in turn bears an external centering ring 31. The two centering rings 30, 31 are fixedly connected to one another, but may also be releasably connected to one another. The centering rings 30, 31 respectively have centering faces 32, 33 provided with serrations. The centering face 32 of the centering ring 30 is located inside the bore of the centering ring 31 which surrounds the centering face 32 at a distance. As in the centering face 16, in the centering faces 32, 33 the serrations are also tapered radially on the insertion side and in the peripheral direction. The centering ring 30 comprises on its insertion side two front-face, axially extending grooves 34 which have a peripheral spacing of 180°. A bolt 35 projecting radially from the centering pin 10 engages with at least one of the grooves 34. By this arrangement, the centering rings 30, 31 may be supported in a torque-proof manner on the centering pin 10 in two positions which are rotated relative to one another by 180°.

For securing the position of the centering rings 30, 31 in the axial direction, the centering pin 10 comprises in the vicinity of its end an annular groove 36 with which a ratchet locking mechanism configured on the centering rings 30, 31 may be engaged.

The receiving and clamping of a double coupling constructional unit 40 takes place by means of the disclosed device in the following manner:

In order to slide on the double coupling constructional unit 40, the centering rings 30, 31 are initially removed from the receiving mandrel 1. Moreover, the clamping sleeve 23 is moved into a release position in which its external diameter is smaller than the internal diameter of the hub bore to be clamped. For this purpose, by means of an actuating plunger 38 arranged on the shaft head 4 of the balancing machine, the actuating pin 18 is moved against the force of the compression spring 22 in the direction of the centering pin 10 and, as a result, the conical portion 26 of the actuating sleeve 15 is moved far enough away from the conical face 27 that the clamping sleeve 23, due to its inherent resilience, is able to adopt its smallest diameter.

The double coupling constructional unit 40 may now be slid onto the receiving mandrel 1 of the device thus adjusted, with the hub 41 of the coupling cage 42 at the front. In this case, the hub 41 is initially pre-centered by a conical face 37 on the front face of the actuating sleeve 15 and then accurately centered by sliding the internally toothed hub portion 43 onto the centering face 16. As soon as the hub 41 has reached the position shown in FIG. 1, in which it rests against the tilting ring 11 in the axial direction, the actuating sleeve 15 is moved by the compression spring 22 in the direction of the shaft head 4 by moving back the plunger 38. As a result, the distance between the conical portion 26 and the conical face 27 is reduced such that the clamping sleeve 23 is radially widened until it rigidly rests against the bore surface of the hub 41 and as a result clamps and additionally centers the hub 41, in particular in the region of the conical face 27.

After the hub 41 of the coupling cage 42 is clamped, further hubs 44 and 45 have to be centered by driving discs 441, 451 of the double coupling constructional unit. This is achieved in that the centering rings 30, 31 which are connected to one another are slid onto the centering pin 10, the serration of the centering faces 32, 33 being inserted into the internal teeth of the hubs 44, 45. After locking the centering rings 30, 31 in position on the annular groove 36, the clamping process is terminated and for balancing the double coupling constructional unit 40 the receiving mandrel 1 may be set in rotary motion therewith. After the balancing, the release of the double coupling constructional unit 40 takes place by reversing the disclosed steps.

Figure 2:
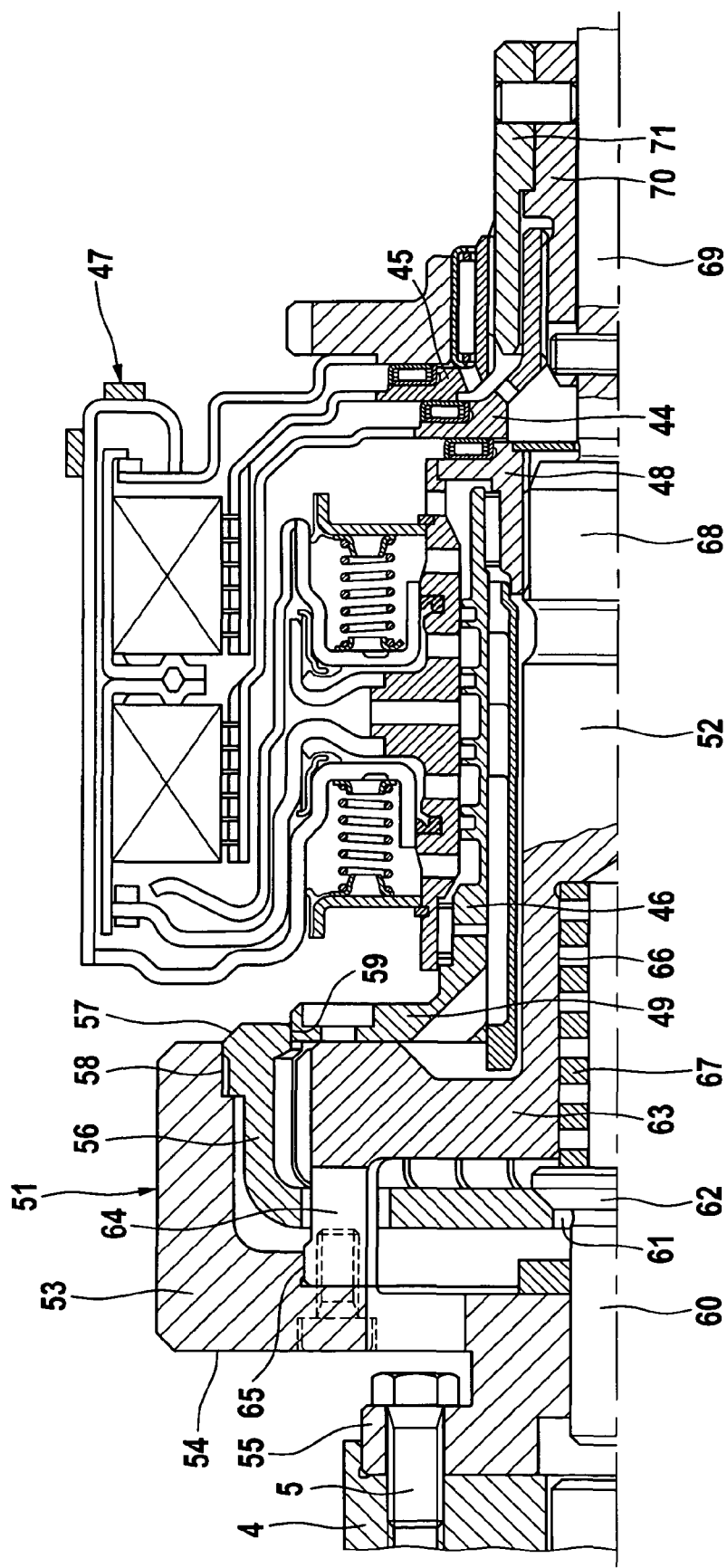

FIG. 2 shows an embodiment of a device according to the invention, in which an externally acting clamping device is provided for clamping a hub body 46 of a double coupling constructional unit 47. The clamping device consists in this case of a clamping chuck 51 which is arranged on the fastening end of a receiving mandrel 52. The clamping chuck 51 comprises a cup-shaped housing 53 with a base 54 and a flange 55 with which the housing 53 is fastened to the shaft head 4 of a balancing machine by screws 5. In the housing 53 is located a single-piece, cup-shaped clamping element 56 which is divided into separate elements by radial slots. The separate elements are connected to one another by material bridges which are arranged alternately on the internal and external periphery of the clamping element 56. At its external periphery, the clamping element 56 comprises a plurality of clamping bodies 57 arranged in an annular manner, which are mounted in an annular recess 58 of the housing 53 and rest radially outwardly as well as axially in the direction of the flange 55 against the wall of the annular recess 58. On the inner face the clamping bodies 57 are provided with a clamping surface 59 which is part of a common coaxial cylinder surface of all the clamping bodies 57.

An actuating element 60 for actuating the clamping element 56 is axially movably arranged in a central through-bore of the housing 53. The actuating element 60 extends through a bore 61 in the clamping element 56 and rests on the side remote from the housing base with a plate-shaped widening 62 on the side remote from the housing 53 against the radial internal edge region of the clamping element 56.

The receiving mandrel 52 has at its fastening end a flange 63 which is located inside the clamping element 56. A plurality of arms 64, arranged at the same peripheral distance from one another extend from the flange 63 through openings in the clamping element 56 as far as the base 54 of the housing 53, to which they are fastened by means of screws. The fastening ends of the arms 64 rest against a centering shoulder 65 of the housing 53 by means of uniform centering faces, whereby accurate centering of the receiving mandrel 52 relative to the housing 53 is provided.

The end of the receiving mandrel 52 on the flange side is also provided with a receiver bore 66 in which a compression spring 67 is arranged. The compression spring 67 acts with a defined force on the actuating element 60 in order to move the clamping element 56 into a clamping position and to hold said clamping element in the clamping position.

The front end of the receiving mandrel 52 has, in a similar manner to the receiving mandrel 1, a mandrel portion with a toothed centering face 68 and a centering pin 69 which is used for receiving centering rings 70, 71.

For receiving the double coupling constructional unit 47, as with the aforementioned embodiment, the clamping chuck 51 is moved into an open position by moving the actuating element 60 in the direction of the compression spring 67 and the centering rings 70, 71 are removed from the centering pin 68. The double coupling constructional unit 47 is then positioned on the receiving mandrel 52, an internally toothed hub portion 48 being centered on the centering face 68 and thus also effecting pre-centering of the hub body 46. If the hub body 46 rests with its flange portion 49 against the flange 63, a part of the cylindrical external surface of the flange portion 49 is located inside the effective region of the clamping surfaces 59 of the clamping bodies 57. By moving back the plunger 38 in the shaft head 4, the clamping element 56 may now be moved by the compression spring 67 into the clamping position. In the clamping position, the clamping bodies 57 rest fixedly against the external surface of the flange 55, resting with their external face on the housing 53. As a result, a precise centering of the flange portion 49 relative to the housing 53 is achieved.

After the hub body 46 is clamped and centered, the hubs 44, 45 associated with the driving discs are centered and connected to the receiving mandrel 52 in a torque-proof manner as described above, through sliding of the centering rings 70, 71.

Figure 3:
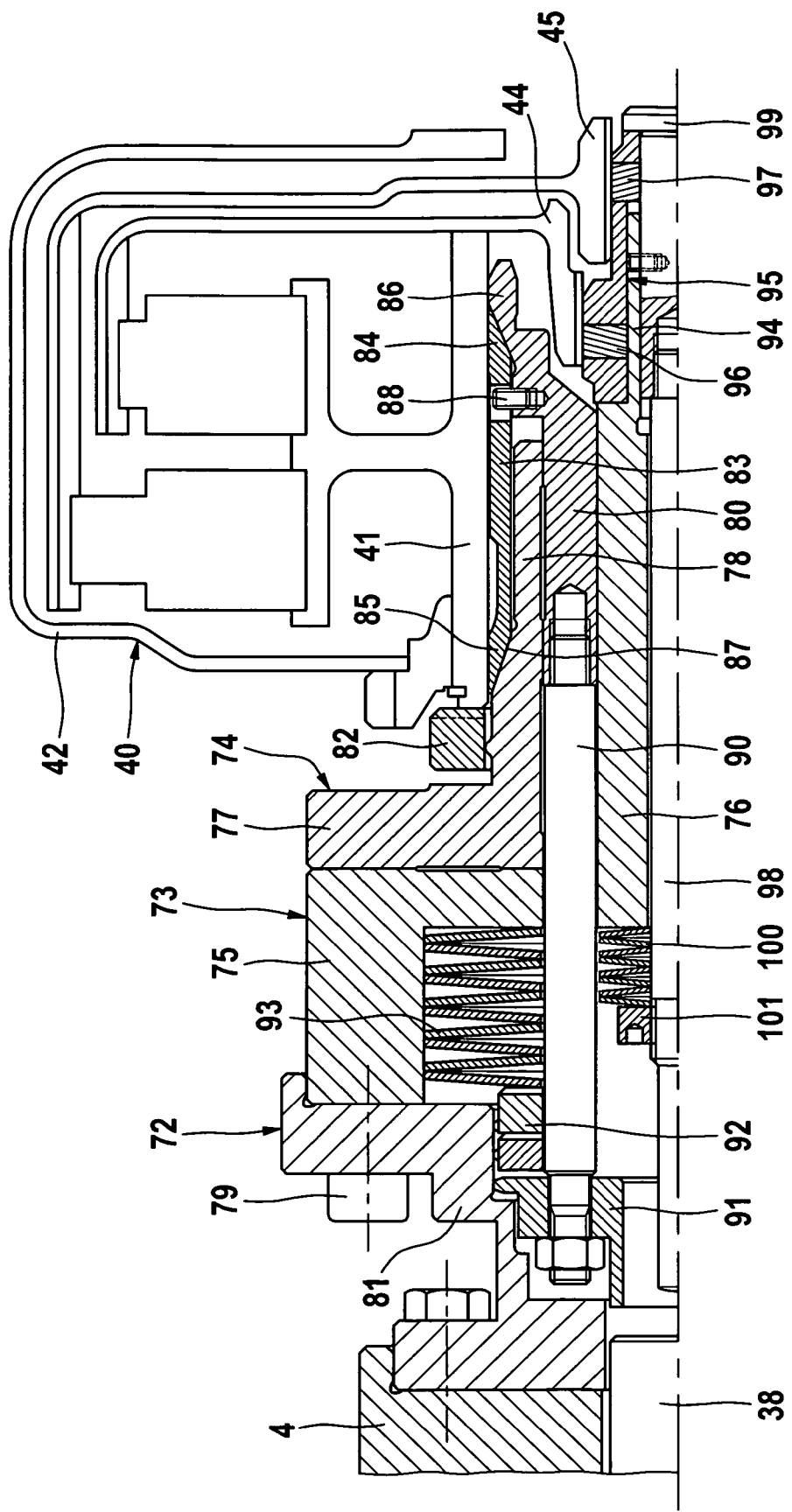

FIG. 3 shows a further embodiment of a device according to the invention. The device comprises a rotationally symmetrical receiving mandrel 72 which is formed from two parts rigidly connected to one another, an internal part 73 and an external part 74. The internal part 73 has a cup-shaped portion 75 and a tubular portion 76 which extends from the base of the cup-shaped portion 75. The external part 74 surrounds the tubular portion 76 and has an annular flange 77 centered on the tubular portion 75 and a sleeve portion 78 projecting from said flange. Between the tubular portion 75 and the sleeve portion 78 an annular intermediate space is provided in which an actuating sleeve 80 is longitudinally movably arranged. The annular flange 77 and the base of the cup-shaped portion 75 rest against one another and are rigidly connected to one another by screws 79, which are also used to fasten an intermediate ring 81 to the open end of the cup-shaped portion 75. The intermediate ring 81 is centered with a ring collar on the cylindrical, external edge of the cup-shaped portion 75 and is used for connecting the receiving mandrel 72 to a shaft head 4 of a balancing machine which may be rotationally driven.

A tilting ring 82 and a clamping sleeve 83 configured as a slotted double conical sleeve are arranged on the sleeve portion 78. The clamping sleeve 83 has axial end regions 84, 85 which have a cylindrical peripheral surface and a conical bore surface which widens towards the outside. With the front end region 84 projecting over the sleeve portion 78, there engages a conical portion 86 of the actuating sleeve 80, the conical face thereof having the same gradient as the conical bore surface of the end region 84. The bore surface of the rear end region 85 rests against a correspondingly inclined conical face 87 of the sleeve portion 78. By means of a set screw 88 which engages in a slot extending in the axial direction in the clamping sleeve 83 and is screwed into the actuating sleeve 80, the clamping sleeve 83 is secured against rotation on the actuating sleeve 80.

The actuating sleeve 80 is connected, by at least two axially parallel connecting rods 90 which are arranged at regular intervals from one another, to an actuating ring 91 which is arranged and axially movably guided in a bore portion of the intermediate ring 81. The connecting rods 90 are passed through openings in the base of the cup-shaped portion 75. On the actuating ring 91, via at least one tilting ring 92, rests a pretensioned spring washer stack 93 which is arranged in the cup-shaped portion 75 of the receiving mandrel 72, the base of the cup-shaped portion 75 forming an abutment for the spring washer stack 93. The preloading of the spring washer stack 93 is designed such that the spring force is sufficient to clamp a received double coupling by means of the clamping sleeve 83, with the required holding force. The amount of preloading force may be varied by inserting or removing washers between the spring washer stack 93 and the adjacent tilting ring 92.

The tubular portion 76 of the internal part 73 has at its free end an end portion 94 defined by a radial step, which has a smaller external diameter. A centering means 95 provided with clamping devices is arranged on the end portion 94. The clamping devices are configured as differential tensioning spindles with two sets of clamps 96, 97 arranged at an axial distance from one another, which have different diameters and consist of annular clamping discs arranged between support rings. For actuating the sets of clamps 96, 97, in a central bore of the internal part 73 a pulling mandrel 98 is provided which rests with a widened head 99 on a support ring of the front set of clamps 97. The pulling mandrel 98 extends as far as the bore of the actuating ring 91, but does not project with its end beyond said actuating ring. Radially inside the spring washer stack 93 and on the pulling mandrel 98 is arranged a spring washer stack 100 which is clamped between the base of the cup-shaped portion 75 and a nut 101 screwed onto the pulling mandrel 98. The spring washer stack 100 is provided with preloading, such that its spring force is sufficient to move the sets of clamps 96, 97 into a clamping position for clamping coupling parts. The magnitude of the force required is in this case determined by the front set of clamps 97, which has a greater axial rigidity than the set of clamps 96. As a result, it is ensured that the more rigid set of clamps 97 transmits the force, which is required for clamping the more flexible set of clamps 96, thereto and only reaches its clamping position when the more flexible set of clamps 96 is clamped.

The reception on the receiving mandrel 72 of a double coupling constructional unit 40 which is to be balanced requires, in a similar manner to the further embodiments described above, that the clamping sleeve 83 and the sets of clamps 96, 97 are moved into their released position in which their external diameters are smaller than the internal diameter of the coupling hub to be clamped. For this purpose, by means of an actuating plunger 38 arranged in the shaft head 4 of the balancing machine, the actuating ring 91 and the pulling mandrel 98 are moved against the force of the spring washer stack 93, 100 in the direction of the free end of the receiving mandrel 72. Owing to this movement, firstly the conical portion 86 of the actuating sleeve 80 is moved away from the conical face 87 so that the clamping sleeve 83, due to its inherent resilience, adopts its smallest diameter. Secondly, the spacing between the head 99 of the pulling mandrel 98 and the shoulder of the tubular portion 76 is enlarged to such an extent that the sets of clamps 96, 97, as a result of their inherent resilience, move into their released position with a smaller external diameter. The double coupling constructional unit 40 may now be slid, with the hub 41 of the coupling cage 42 at the front, onto the receiving mandrel 72 of the device thus adjusted, up until the hub 41 bears against the tilting ring 82. During the sliding, conical face portions on the insertion ends of the actuating sleeve 80 and the support rings of the sets of clamps 96, 97 ensure appropriate pre-centering.

After the double coupling constructional unit 40 has adopted the position shown in FIG. 3 on the receiving mandrel 72, the actuating plunger 38 is moved back into its initial position. In this case, the more flexible set of clamps 96 supported on the step of the portion 76 is initially clamped by the spring washer stack 100 and subsequently the more rigid set of clamps 97. By means of the clamped set of clamps 96, the hub 44 is precisely centered and rigidly clamped to the end portion 94. The clamping set 97 centers the hub 45 and clamps it rigidly to the pulling mandrel 98, which is guided in a precision-fit manner in the bore of the end portion 94 and is secured against rotation relative to the end portion 94. If the sets of clamps 96, 97 are clamped, the actuating plunger 38 is pulled away from the end of the pulling mandrel 98 and is pulled back again into the shaft head 4. The actuating ring 91 is caused to follow this movement by the force of the spring washer stack 93, and via the connecting rods 90 pulls the actuating sleeve further in the direction of the conical face 87, whereby the clamping sleeve 83 is radially widened until it rigidly rests against the bore surface of the hub 41 and the hub 41 is clamped and centered on the tubular portion 76.

The temporal sequence for clamping the sets of clamps 96, 97 and the clamping sleeve 83 is determined by the axial spacing between the ends of the actuating ring 91 and the pulling mandrel 98, which cooperate with the actuating plunger 38. If, deviating from the above description, the clamping of the hub 41 takes place before the clamping of the hubs 44, 45, then in contrast to FIG. 3, the actuating ring 91 must be at a greater distance and the pulling mandrel 98 must be at a smaller distance from the front surface of the actuating plunger 38.

If the double coupling constructional unit 40 as disclosed is tensioned, the receiving mandrel 72 is set in rotation and balanced.

In many cases, a second balancing process is subsequently desired in which the hub 41 is rotated with the coupling cage 42 relative to the hubs 44, 45. In order to achieve this the actuating plunger 38 is advanced only to such an extent that the clamping sleeve 83 alone is loosened, whilst the sets of clamps 96, 97 remain clamped. The coupling cage 42 may now be rotated relative to the receiving mandrel 72 whilst the hubs 44, 45 remain in their clamping position. Subsequently, the hub 41 is again clamped and the double coupling constructional unit again balanced. After completing the balancing processes, the release of the double coupling constructional unit is achieved in that the clamping devices are moved back into the initial position determined for positioning the double coupling constructional unit.

What is claimed is:

1. A device for receiving a multi-part constructional unit of a double coupling in a balancing machine, comprising a receiving mandrel which can be driven in rotation about its longitudinal axis and has a first portion for receiving and centering a first coupling part and a second portion arranged at its free end for receiving and centering at least one second coupling part, a first clamping device which is arranged on the first portion, can be moved by spring force into a clamping position and has a clamping face coaxial with the longitudinal axis of the receiving mandrel and a centering means which is arranged on the second portion and by means of which the second coupling part can be coupled in a torque-proof manner with the receiving mandrel in at least one angle position.

2. A device according to claim 1, wherein the first clamping device has a radially expandable clamping sleeve which is arranged on the receiving mandrel so as to be axially movable and can rest against a conical face of the receiving mandrel.

3. A device according to claim 2, wherein the clamping sleeve is a slotted double conical sleeve which is radially expandable by means of a conical portion of an actuating sleeve arranged displaceably on the receiving mandrel.

4. A device according to claim 1, wherein the first clamping device has an externally acting clamping chuck which rests against a housing connected to the receiving mandrel.

5. A device according to claim 1, wherein the centering means has a second clamping device which is movable by spring force into a clamping position.

6. A device according to claim 5, wherein the first and the second clamping device can be successively actuated by the same actuating element in such a way that one clamping device is releasable when the other clamping device is clamped.

7. A device according to claim 5, wherein the second clamping device can be actuated independently of the first clamping device.

8. A device according to claim 5, wherein the second clamping device can be moved by a compression spring into the clamping position and in that the receiving mandrel has a longitudinal hole in which there are arranged the compression spring and an axially movable actuating element transmitting the force of the compression spring onto the clamping device.

9. A device according to claim 5, wherein the second clamping device has at least one set of clamps comprising annular clamping discs and means for axially tightening the clamping discs.

10. A device according to claim 1, wherein the first clamping device can be moved by a compression spring into the clamping position and in that the receiving mandrel has a longitudinal hole in which there are arranged the compression spring and an axially movable actuating element transmitting the force of the compression spring onto the clamping device.

11. A device according to claim 1, wherein the receiving mandrel has a centering face for centering the first coupling part.

12. A device according to claim 11, wherein the centering face of the receiving mandrel is provided with toothing.

13. A device according to claim 12, wherein, on the insertion side in the axial and radial directions, the toothings on the receiving mandrel and on the centering ring are tapered toward the end of the teeth.

14. A device according to claim 1, wherein the second portion of the receiving mandrel forms a centering pin and the centering means has a centering ring which is releasably held on the centering pin and has a centering face for centering a second coupling part.

15. A device according to claim 14, wherein the centering face of the centering ring is provided with toothing.

16. A device according to claim 15, wherein, on the insertion side in the axial and radial directions, the toothings on the receiving mandrel and on the centering ring are tapered toward the end of the teeth.

17. A device according to claim 14, wherein the centering ring has on its insertion side at least one coupling recess with which at least one coupling projection configured on the receiving mandrel engages when the centering ring is connected to the centering pin.

18. A device according to claim 17, wherein a plurality of coupling recesses or coupling projections are provided, so the centering ring can be coupled in a torque-proof manner with the coupling pin in a plurality of rotational angle positions.

19. A device according to claim 14, wherein a detent which can be locked in a positive interlocking manner is provided on the centering pin for axially fixing the centering ring.

* * * * *